(12) United States Patent
Knowles et al.

(10) Patent No.: US 6,620,235 B1
(45) Date of Patent: Sep. 16, 2003

(54) PIGMENT COMPOSITIONS AND PROCESS OF SHADING

(75) Inventors: Ian William Knowles, Heaton Chapel (GB); Robert Watsfeldt, Billdal (SE); Kjell Erik Kumlin, Karlstad (SE)

(73) Assignees: Ciba Specialty Chemicals Corporation, Tarrytown, NY (US); Stora Enso AB, Halun (SE)

( * ) Notice: Subject to any disclaimer, the term of this patent is extended or adjusted under 35 U.S.C. 154(b) by 0 days.

(21) Appl. No.: 09/937,978

(22) PCT Filed: Apr. 3, 2000

(86) PCT No.: PCT/EP00/02955

§ 371 (c)(1),
(2), (4) Date: Jan. 9, 2002

(87) PCT Pub. No.: WO00/61689

PCT Pub. Date: Oct. 19, 2000

(30) Foreign Application Priority Data

Apr. 8, 1999 (GB) .............................................. 9907878

(51) Int. Cl.⁷ .............................................. C09B 67/22
(52) U.S. Cl. ...................... 106/494; 106/495; 106/497; 106/498; 106/410; 106/411
(58) Field of Search ................. 106/494, 495, 106/497, 498, 410, 411

(56) References Cited

U.S. PATENT DOCUMENTS

| | | | |
|---|---|---|---|
| 2,844,485 A | 7/1958 | Struve ........................ 106/288 |
| 3,074,950 A | 1/1963 | Deuschel et al. ........... 260/279 |
| 5,131,981 A | 7/1992 | Hahn et al. ................. 162/162 |
| 5,472,494 A | * 12/1995 | Hetzenegger et al. ....... 106/493 |
| 5,476,544 A | * 12/1995 | Endo et al. .................. 106/499 |
| 5,518,539 A | 5/1996 | Hao et al. .................... 106/495 |
| 5,922,122 A | * 7/1999 | Takeda et al. ............... 106/493 |
| 6,033,444 A | 3/2000 | Ahlinder ..................... 8/637.1 |
| 6,063,182 A | * 5/2000 | Babler ........................ 106/506 |
| 6,194,480 B1 | * 2/2001 | Takeda et al. ................ 522/75 |
| 6,468,341 B2 | * 10/2002 | Wada et al. ................. 106/413 |

FOREIGN PATENT DOCUMENTS

| | | |
|---|---|---|
| EP | 0632108 | 1/1995 |
| EP | 0654506 | 5/1995 |
| FR | 941218 | 1/1949 |
| FR | 2084891 | 12/1971 |
| GB | 1348571 | 3/1974 |
| GB | 2071683 | 9/1981 |

* cited by examiner

*Primary Examiner*—Anthony J. Green
(74) *Attorney, Agent, or Firm*—David R. Crichton

(57) ABSTRACT

Compositions comprising a) a mixture of i) C.I. Pigment Violet 19 together with either C.I. Pigment Blue 15 or C.I. Pigment Blue 60, or ii) C.I. Pigment Red 177 together with either C.I. Pigment Blue 15 or C.I. Pigment Blue 60, and b) a dispersant, c) optionally a biocide, and d) water. A process for shading of paper using said compositions or by applying separate pigment dispersions of a) C.I. Pigment Violet 19 and either C.I. Pigment Blue 15 or C.I. Pigment Blue 60, or b) C.I. Pigment Red 177 and either C.I. Pigment Blue 15 or C.I. Pigment Blue 60.

25 Claims, No Drawings

PIGMENT COMPOSITIONS AND PROCESS OF SHADING

The present invention relates to compositions comprising special pigments which meet BGVV specifications for food packaging materials.

It is the object of the present invention to provide a pigment composition which can be used for the shading of food packaging materials, especially such materials which are made of paper.

In one aspect, the invention relates to a composition comprising
- a) a mixture of C.I. Pigment Violet 19 together with either C.I. Pigment Blue 15 or C.I. Pigment Blue 60,
- b) a dispersant,
- c) optionally a biocide, and
- d) water.

One preferred form of this composition comprises a mixture of C.I. Pigment Violet 19 together with C.I. Pigment Blue 15, in which mixture the amount by weight of C.I. Pigment Violet 19 is greater than 50%, based on the weight of the mixture of pigments. The mixture of pigments contains usually 60% to 95% by weight, preferably 70% to 90% by weight, of C.I. Pigment Violet 19, based on the weight of the mixture of pigments. Particularly preferred are compositions wherein the mixture of pigments contains 75% to 85% by weight of C.I. Pigment Violet 19 and 15% to 25% by weight of C.I. Pigment Blue 15.

A further preferred form of this composition comprises a mixture of C.I. Pigment Violet 19 together with C.I. Pigment Blue 15 or C.I. Pigment Blue 60, in which mixture the amount by weight of C.I. Pigment Violet 19 is less than 50%, based on the weight of the mixture of pigments. Particularly preferred compositions comprise a mixture of pigments containing C.I. Pigment Violet 19 together with C.I. Pigment Blue 60. The mixture of pigments contains usually 30% to less than 50% by weight, preferably 40% to less than 50% by weight of C.I. Pigment Violet 19, based on the weight of the mixture of pigments.

In a second aspect, this invention relates to a composition comprising
- a) a mixture of C.I. Pigment Red 177 together with C.I. Pigment Blue 15 or C.I. Pigment Blue 60,
- b) a dispersant,
- c) optionally a biocide, and
- d) water.

Particularly preferred are compositions that include a mixture of pigments containing C.I. Pigment Red 177 together with C.I. Pigment Blue 60. The mixture of pigments contains usually below 60% by weight, preferably below 50% by weight of C.I. Pigment Red 177, based on the weight of the mixture of pigments. Highly preferred are mixtures of pigments which contain 20 or 25 to 40% by weight of C.I. Pigment Red 177 and 60 to 75% by weight of C.I. Pigment Blue 60.

The compositions in all aspects of the invention contain preferably 0.1 to 40%, more preferably 10 to 30% of pigments, most preferably around 20% of pigments, based on the weight of the composition.

The size of the pigments can range from a few nanometres to several hundreds of microns. Preferred is an average size distribution of 0.01 to 1 micron.

The dispersant usually is present in the composition in an amount of 0.1 to 30%, preferably 0.1 to 8% by weight, most preferably 3 to 6%, based on the weight of the composition.

Preferred dispersants are for example polyacrylic acid, polymethacrylic acid, polymaleic anhydride, polyurethane, polyvinylether, polyvinylalcohol, polyalkylene glycol, polyethylene oxide, cellulose derivatives, polyimine, polyvinylpyridine, or copolymers thereof, or copolymers such as copolymers of acrylic acid with styrene, acrylonitrile, vinylacetate, vinylphosphonate, vinylpropionate, vinylchloride, itaconic acid or maleic anhydride, or a mixture thereof. Suitable polymeric derivatives are for example ethoxylated or propoxylated fatty amines such as ethoxylated cocoalkyl, oleyl or soyaalkyl amines; ethoxylated or propoxylated fatty quatemary salts such as ethoxylated cocoalkyltrimethyl ammonium chloride; ethoxylated fatty amides such as ethoxylated oleamides; alkyl-, cycloalkyl- or alkylaryl-oxypoly(ethylenoxy)ethanol, cycloalkyloxypoly(ethylenoxy)laurate or oleate, polyethylene glycol 400 laurate or oleate, alkyl-, cycloalkyl- or alkylaryl-poly(ethylenoxy)carboxylate or phosphonate. An especially preferred cycloalkyloxypoly(ethylenoxy) laurate or oleate is for example a poly(ethylenoxy)sorbitan laurate or oleate. Particularly preferred dispersants include polymers of aromatic sulphonic acids with formaldehyde, and salts thereof. Typically the dispersants have molecular weights in the range 1000 to 10,000, preferably 2,000 to 5,000, especially 2,500 to 3,500. These preferably water-soluble polymers, copolymers and/or polymer derivatives are known per se and are commercially available.

Preferably, the compositions contain a biocide. All FDA and BGVV compliant biocides are suitable for this application. Any of such biocide capable of inhibiting the growth of either or all of Gram positive or Gram negative bacteria, yeasts or fungi may be employed according to the present invention. Suitable biocides include thiazol-3-one derivatives, for instance alkyl and/or chlorinated derivatives of thiazol-3-one or mixtures thereof. Typically the biocide is present at levels of from about 15 parts per million (ppm) by weight of the composition to about 1000 ppm, most preferably from about 50 ppm to about 500 ppm by weight of the composition.

A further object of the present invention is to provide a process for the shading of paper wherein either of the above compositions or separate dispersions of said constituent pigments are applied to at least one stage of the paper making process.

Thus one aspect of the invention relates to a process for shading of paper to be used for food packaging material, which process comprises applying to at least one stage of the paper making process either
- a) a composition comprising
    - i) a mixture of C.I. Pigment Violet 19 together with C.I. Pigment Blue 15,
    - ii) a dispersant,
    - iii) optionally a biocide, and
    - iv) water.

or

- b) an aqueous dispersion of C.I. Pigment Violet 19 and an aqueous dispersion of C.I. Pigment Blue 15.

The aqueous pigment dispersions of C.I. Pigment Violet 19 comprises,
- a) C.I Pigment Violet 19,
- b) a dispersant,
- c) optionally a biocide, and
- d) water.

The aqueous pigment dispersion of C.I. Pigment Blue 15 comprises,
- a) C.I Pigment Blue 15,
- b) a dispersant, c) optionally a biocide, and d) water.

The preferences given before for the compositions also apply to the process for applying the compositions.

In one preferred form of the process of shading paper, a dispersion of C.I. Pigment Violet 19 and a dispersion of C.I. Pigment Blue 15 are applied to at least one stage of the paper making process, wherein the C.I. Pigment 19 is added in an amount of greater than 50% by weight of added pigments. The C.I. Pigment 19 is usually added in an amount of 60% to 95% by weight, preferably 70% to 90% by weight of the added pigments. In a particularly preferred form of the process C.I. Pigment Violet 19 is added in an amount of 75% to 85% by weight and C.I. Pigment Blue 15 is added in an amount of 15% to 25% by weight of C.I. Pigment Blue 15 based on the weight of the added pigments.

In another preferred form of the process a dispersion of C.I. Pigment Violet 19 and a dispersion of either C.I. Pigment Blue 15 or C.I. Pigment Blue 60 are added to at least one stage of the paper making process, wherein amount of C.I. Pigment Violet 19 used is less than 50% of the total amount of pigment used. The amount of C.I. Pigment Violet 19 used is usually 30% to less than 50% by weight, preferably 40% to less than 50% by weight, based on the weight of the pigments used.

A further aspect of the process of the invention relates to a process for shading of paper to be used for food packaging material, which process comprises applying at least one stage of the paper making process either a) a composition comprising,
   i) a mixture of C.I. Pigment Red 177 together with C.I. Pigment Blue 15 or C.I. Pigment Blue 60,
   ii) a dispersant,
   iii) optionally a biocide, and
   iv) water, or b) an aqueous dispersion of C.I. Pigment Red 177 and an aqueous dispersion of either C.I. Pigment Blue 15 or C.I. Pigment Blue 60.

The aqueous pigment dispersions of C.I. Pigment Red 177 comprises, a) C.I. Pigment Red 177, b) a dispersant, c) optionally a biocide, and d) water.

The aqueous pigment dispersion of C.I. Pigment Blue 15 or C.I. Pigment Blue 60 comprises, a) C.I. Pigment Blue 15 or C.I. Pigment Blue 60, b) a dispersant, c) optionally a biocide, and d) water.

In the process of shading paper in which a dispersion of C.I. Pigment Red 177 and a dispersion of either C.I. Pigment Blue 60 or C.I. Pigment Blue 15 is added to at least one stage of the paper making process, C.I. Pigment Red 177 is usually added in an amount below 60% by weight, preferably below 50% by weight, of the added pigments. In a particularly preferred process C.I. Pigment Red 177 is added in an amount of 20 or 25 to 40% by weight, based on the weight of added pigments and C.I. Pigment Blue 15 or C.I. Pigment Blue 60 is added in an amount of 60 to 75% by weight of the added pigments.

When separate pigment dispersions are applied to the process it is possible for the aqueous pigment dispersions to be added at different stages of the paper making process, though best results are usually obtained if the pigment dispersions are added to the same stage. As for the combined pigment compositions the separate aqueous pigment dispersions contain preferably 0.1 to 40%, more preferably 10 to 30%, most preferably around 20% of the respective pigment, based on the weight of the dispersion. Generally the amounts of dispersants and biocides used in each of the aqueous pigment dispersions would be substantially the same as the amounts used in the composition given before.

According to conventional paper making processes the pulp is processed in a mixing chest where it is mixed in a conventional manner to form a thick stock, which is then diluted to form the thin stock, the thin stock is passed towards a drainage screen through various items of apparatus such as a fan pump and a centri screen, and the thin stock is drained through a screen so as to form a sheet, which is then dried. Such conventional processes are described, for example, in US-A-5,676,796.

For example, the composition can be added to the pulp, the mixing chest, the thick stock or the thin stock.

Whether the pigments are added in the form of the composition or in the form of separate pigment dispersions they are as a rule added in an amount of 5 to 1000 g per tonne, preferably in an amount of 10 to 400 g/tonne and most preferably in an amount of 50 or 100 to 400 g/tonne. The gram hereby refers to equivalent total dry weight of pigment added and the tonne hereby refers to the equivalent dry weight of material the composition or pigment dispersions are added to (for example the pulp).

In addition, at one of the stages of the paper making process a cationic coagulant or cationic retention aid can be added.

Preferably, the cationic coagulant is added prior to dilution, most preferably to the thick stock.

The coagulant usually is added in an amount of 10 to 1000 g/tonne, preferably in an amount of 50 to 700 g/tonne and most preferably in an amount of 100 to 500 g/tonne. The tonne hereby refers to the material the composition is added to (for example the thick stock).

Typical examples of coagulants are polyamine epichlorohydrin, polyethylene imine, polymers of cationic monomers such as diallyl dimethyl ammonium chloride, dialkyl aminoalkyl (meth)acrylates or quatemary ammonium salts, dialkyl aminoalkyl (meth)acrylamides or quatemary ammonium salts. Preferred are coagulants which have an intrinsic viscosity (IV) of below 3 dl/g and a cationic charge density of at least 4 meq/g.

The cationic retention aid may be the same polymer as the cationic coagulant or more usually is either cationic starch or a copolymer of cationic monomers such as diallyl dimethyl ammonium chloride, dialkyl aminoalkyl (meth)acrylates or quatemary ammonium salts, dialkyl aminoalkyl (meth) acrylamides or quaternary ammonium salts with nonionic monomers such as acrylamide. Typically the cationic retention aids are synthetic polymers which have which have an intrinsic viscosity (IV) of at least 3 dl/g, usually at least 4 or 5 dl/g and can be as high as 10 or 12 dl/g or higher. Typically the cationic retention aids can have a cationic charge density of below 4 meq/g, preferably below 3 meq/g, Another object of the present invention is the use of the inventive composition for shading of paper to be used for food packaging material.

The paper may be filled or unfilled paper and may be lightweight or heavyweight.

The paper may be, for instance, paper board.

The special combination of pigments used according to the present invention allows shading of food packaging materials in a good manner. Especially for paper materials a very good whiteness is obtained.

These dispersions are suited for direct food contact packaging, eliminating the need for overwrapping foods. (Color additive petition for paper and board is pending.) The food can be in liquid form as well as in solid form.

Furthermore, the dispersions are stable for a longer period of time and can therefore be stored before application, without showing deposits resulting in deterious application properties.

The following examples illustrate various embodiments of the invention, but the scope of the invention is not limited thereto. In the examples, percentages are by weight, unless otherwise indicated.

EXAMPLE 1

By mixing the following dispersion is prepared:
16 wt % C.I. Pigment Violet 19
4 wt % C.I. Pigment Blue 15
5.6 wt % 2-naphthalene sulphonic acid polymer with formaldehyde, sodium salt
0.008 wt % 5-chloro-2-methyl-2H-isothiazol-3-one
0.003 wt % 2-methyl-2H-isothiazol-3-one.
74.389 wt % water

EXAMPLES 2 to 5

To a pulp comprising an elemental chlorine free blend of 70% bleached hardwood and 30% bleached softwood, 10% by weight of a filler (calcium carbonate) and 1.5% of a conventional sizing agent (Keydime C), the pulp having a pH of about 7.2, are added the dispersions given in the following Table 1 (the amounts given in Table 1 are given in % by weight, based on the weight of the pulp):

TABLE 1

| Example | Amount of the dispersion of Example 1 (based on the weight of the pulp) |
|---|---|
| 2 | 100 g/tonne |
| 3 | 200 g/tonne |
| 4 | 300 g/tonne |
| 5 | 500 g/tonne |

The pulp is processed further according to conventional methods, which means in the mixing chest the pulp is mixed in a conventional manner to form a thick stock, which is then diluted to form the thin stock, the thin stock is passed towards a drainage screen through various items of apparatus such as a fan pump and a centri screen, and draining the thin stock through a screen so as to form a sheet, which is then dried. In each case a paper is obtained which shows very good whiteness.

EXAMPLE 6

The above Example 4 is repeated, except that just prior to diluting the thick stock 300 g/tonne of a coagulant (Nalco 7607) is added. A paper is obtained which shows very good whiteness.

EXAMPLE 7

By mixing the dispersions given in the following Table 2 are prepared:

TABLE 2

| Dispersion | Violet Pigment | Blue Pigment | Dispersant | *Biocide | Water |
|---|---|---|---|---|---|
| A1 | 9.8% of C.I. Pigment Violet 19 | 10.2% of C.I. Pigment Blue 60 | 5.6% of 2-naphthalene sulphonic acid polymer with formaldehyde, sodium salt | 0.008% of CMITO and 0.003% of MITO | Water made up to 100% |
| B1 | 4.9% of C.I. Pigment Violet 19 | 5.1% of C.I. Pigment Blue 15 | 5.6% of 2-naphthalene sulphonic acid polymer with formaldehyde, sodium salt | 0.008% of CMITO and 0.003% of MITO | Water made up to 100% |

*The biocide CMITO is 5-chloro-2-methyl-2H-isothiazol-3-one and MITO is 2-methyl-2H-isothiazol-3-one.

EXAMPLES 8 to 15

To a pulp comprising an elemental chlorine free blend of 70% bleached hardwood and 30% bleached softwood, 10% by weight of a filler (calcium carbonate) and 1.5% of a conventional sizing agent (Keydime C), the pulp having a pH of about 7.2, are added, the dispersions given in the following Table 2 (the amounts given in Table 2 are given in % by weight, based on the weight of the pulp):

TABLE 3

| Example | Dispersion | Amount of the dispersion based on the weight of the pulp |
|---|---|---|
| 8 | A1 | 100 g/tonne |
| 9 | A1 | 200 g/tonne |
| 10 | A1 | 300 g/tonne |
| 11 | A1 | 500 g/tonne |
| 12 | B1 | 100 g/tonne |
| 13 | B1 | 200 g/tonne |
| 14 | B1 | 300 g/tonne |
| 15 | B1 | 500 g/tonne |

The pulp is processed further according to conventional methods, which means in the mixing chest the pulp is mixed in a conventional manner to form a thick stock, which is then diluted to form the thin stock, the thin stock is passed towards a drainage screen through various items of apparatus such as a fan pump and a centri screen, and draining the thin stock through a screen so as to form a sheet, which is then dried. In each case a paper is obtained which shows very good whiteness.

EXAMPLES 16 and 17

Each of the above Examples 10 and 14 are repeated, except that just prior to diluting the thick stock 300 g/tonne of a coagulant (Nalco 7607) is added. In each case a paper is obtained which shows very good whiteness.

EXAMPLE 18

By mixing the following dispersions of C.I. Pigment Red 177, C.I. Pigment Blue 15 and Pigment Blue 60 are prepared:

---

C.I. Pigment Red 177 Dispersion

| | |
|---|---|
| 19.9% | C.I. Pigment Red 177 |
| 4.0% | 2-Naphthalene sulphonic acid, polymer with formaldehyde, sodium salt |
| 0.008% | 5-Chloro-2-methyl-2H-isoithiazol-3-one |
| 0.003% | 2-Methyl-2H-isothiazol-3-one |
| 79.089% | Water |

C.I. Pigment Blue 60 Dispersion

| | |
|---|---|
| 19.6% | C.I. Pigment Blue 60 |
| 5.74% | 2-Naphthalene sulphonic acid, polymer with formaldehyde, sodium salt |
| 0.008% | 5-Chloro-2-methyl-2H-isoithiazol-3-one |
| 0.003% | 2-Methyl-2H-isothiazol-3-one |
| 79.649% | Water |

C.I. Pigment Blue 15 Dispersion

| | |
|---|---|
| 18.50% | C.I. Pigment Blue 15 |
| 5.60% | 2-Naphthalene sulphonic acid, polymer with formaldehyde, sodium salt |
| 0.008% | 5-Chloro-2-methyl-2H-isoithiazol-3-one |
| 0.003% | 2-Methyl-2H-isothiazol-3-one |
| 75.889% | Water |

---

EXAMPLES 19 to 22

To a thick stock comprising an elemental chlorine free blend of 70% bleached hardwood and 30% bleached softwood, 10% by weight of a filler (calcium carbonate) and 1.5% of a conventional sizing agent (Keydime C), the pulp having a pH of about 7.2, pigment dispersions are added to the thick stock at doses given in Table 4 based.

TABLE 4

| Example | C.I. Pigment Red 177 Dispersion | C.I Pigment Blue 60 Dispersion | C.I. Pigment Blue 15 Dispersion |
|---|---|---|---|
| 19 | 60 g/tonne | 200 g/tonne | — |
| 20 | 20 g/tonne | 66 g/tonne | — |
| 21 | 6 g/tonne | 20 g/tonne | — |
| 22 | 114 g/tonne | — | 86 g/tonne |

The pulp is processed further according to conventional methods, which means in the mixing chest the pulp is mixed in a conventional manner to form a thick stock, which is then diluted to form the thin stock, the thin stock is passed towards a drainage screen through various items of apparatus such as a fan pump and a centri screen, and draining the thin stock through a screen so as to form a sheet, which is then dried. In each case a paper is obtained which shows very good whiteness.

EXAMPLES 23 and 24

Each of the above Examples 19 and 22 is repeated, except that just prior to diluting the thick stock 300 g/tonne of a coagulant (Nalco 7607) is added. In each case a paper is obtained which shows very good whiteness.

What is claimed is:

1. A composition comprising
   a) a mixture of C.I. Pigment Violet 19 together with either C.I. Pigment Blue 15 or C.I. Pigment Blue 60, in which mixture the amount by weight of C.I. Pigment Violet 19 is greater than 50%, based on the weight of the mixture of pigments,
   b) a dispersant,
   c) optionally a biocide, and
   d) water.

2. A composition according to claim 1 wherein component a) comprises a mixture of C.I. Pigment Violet 19 together with C.I. Pigment Blue 15.

3. A composition according to claim 1, wherein the mixture of pigments contains 60% to 95% by weight of C.I. Pigment Violet 19.

4. A composition according to claim 1, wherein the mixture of pigments contains 70% to 90% by weight of C.I. Pigment Violet 19.

5. A composition according to claim 1, wherein the mixture of pigments contains 75% to 85% by weight of C.I. Pigment Violet 19 and 15% to 25% by weight of C.I. Pigment Blue 15.

6. A composition according to claim 1, which contains 0.1 to 40% pigment, based on the weight of the composition.

7. A composition according to claim 1, which contains 0.1 to 30% by weight dispersant, based on the total weight of the composition.

8. A composition according to claim 1, which contains a biocide.

9. A composition according to claim 1, wherein the dispersant is polyacrylic acid, polymethacrylic acid, polymaleic anhydride, polyurethane, polyvinylether, polyvinylalcohol, polyalkylene glycol, polyethylene oxide, cellulose derivatives, polyimine, polyvinylpyridine, or copolymers thereof, or copolymers of acrylic acid with styrene, acrylonitrile, vinylacetate, vinylphosphonate, vinylpropionate, vinylchloride, itaconic acid or maleic anhydride, or ethoxylated or propoxylated fatty, ethoxylated or propoxylated fatty quaternary salts, ethoxylated fatty amides, alkyl-, cycloalkyl- or alkylaryl-oxypoly(ethylenoxy)ethanol, cycloalkyloxypoly(ethylenoxy)laurate or oleate; polyethylene glycol 400 laurate or oleate, alkyl-, cycloalkyl- or alkylaryl-poly(ethylenoxy)carboxylate or phosphonate or aromatic sulphonic acid polymer with formaldehyde or salts thereof.

10. A composition comprising
    a) a mixture of C.I. Pigment Violet 19 together with C.I. Pigment Blue 15 or C.I. Pigment Blue 60, in which mixture the amount by weight of C.I. Pigment Violet 19 is less than 50%, based on the weight of the mixture of pigments,
    b) a dispersant,
    c) optionally a biocide, and
    d) water.

11. A composition according to claim 10, wherein the mixture of pigments contains C.I. Pigment Violet 19 together with C.I. Pigment Blue 60.

12. A composition according to claim 10, wherein the mixture of pigments contains 30% to less than 50% by weight of C.I. Pigment Violet 19.

13. A composition according to claim 10, wherein the mixture of pigments contains 40% to less than 50% by weight of C.I. Pigment Violet 19.

14. A composition according to claim 10, which contains 0.1 to 40% pigment, based on the weight of the dispersion.

15. A composition according to claim 10, which contains 0.1 to 30% dispersant, based on the total weight of the composition.

16. A composition according to claim 10, which contains a biocide.

17. A composition according to claim 10, wherein the dispersant is polyacrylic acid, polymethacrylic acid, polymaleic anhydride, polyurethane, polyvinylether, polyvinylalcohol, polyalkylene glycol, polyethylene oxide, cellulose derivatives, polyimine, polyvinylpyridine, or copolymers thereof, or copolymers of acrylic acid with styrene, acrylonitrile, vinylacetate, vinylphosphonate, vinylpropionate, vinylchloride, itaconic acid or maleic anhydride, or ethoxylated or propoxylated fatty, ethoxylated or propoxylated fatty quaternary salts, ethoxylated fatty amides, alkyl-, cycloalkyl- or alkylaryl-oxypoly(ethylenoxy)ethanol, cycloalkyloxypoly(ethylenoxy)laurate or oleate, polyethylene glycol 400 laurate or oleate, alkyl-, cycloalkyl- or alkylaryl-poly(ethylenoxy)carboxylate or phosphonate or aromatic sulphonic acid polymer with formaldehyde or salts thereof.

18. A composition comprising
   a) a mixture of C.I. Pigment Red 177 together with C.I. Pigment Blue 15 or C.I. Pigment Blue 60, wherein the mixture of pigment contains below 60% by weight of C.I. Pigment Red 177,
   b) a dispersant,
   c) optionally a biocide, and
   d) water.

19. A composition according to claim 18, wherein the mixture of pigments contains C.I. Pigment Red 177 together with C.I. Pigment Blue 60.

20. A composition according to claim 18, wherein the mixture of pigments contains below 50% by weight of C.I. Pigment Red 177.

21. A composition according to claim 18, wherein the mixture of pigments contains 20 to 40% by weight of C.I. Pigment Red 177 and 60 to 75% by weight of C.I. Pigment Blue 60.

22. A composition according to claim 18, which contains 0.1 to 40% pigment, based on the weight of the dispersion.

23. A composition according to claim 18, which contains 0.1 to 30% dispersant, based on the total weight of the composition.

24. A composition according to claim 18, which contains a biocide.

25. A composition according to claim 18, wherein the dispersant is polyacrylic acid, polymethacrylic acid, polymaleic anhydride, polyurethane, polyvinylether, polyvinylalcohol, polyalkylene glycol, polyethylene oxide, cellulose derivatives, polyimine, polyvinylpyridine, or copolymers thereof, or copolymers of acrylic acid with styrene, acrylonitrile, vinylacetate, vinylphosphonate, vinylpropionate, vinylchloride, itaconic acid or maleic anhydride, or ethoxylated or propoxylated fatty, ethoxylated or propoxylated fatty quaternary salts, ethoxylated fatty amides, alkyl-, cycloalkyl- or alkylaryl-oxypoly(ethylenoxy)ethanol, cycloalkyloxypoly(ethylenoxy)laurate or oleate, polyethylene glycol 400 laurate or oleate, alkyl-, cycloalkyl- or alkylaryl-poly(ethylenoxy)carboxylate or phosphonate or aromatic sulphonic acid polymer with formaldehyde or salt thereof.

* * * * *